(12) United States Patent
Beteille et al.

(10) Patent No.: US 7,002,720 B2
(45) Date of Patent: Feb. 21, 2006

(54) ELECTRICALLY CONTROLLABLE DEVICE HAVING VARIABLE OPTICAL AND/OR ENERGY PROPERTIES

(75) Inventors: Fabien Beteille, Revel (FR); Samuel Dubrenat, Paris (FR); Jean-Christophe Giron, Aachen (DE)

(73) Assignee: Saint-Gobain Glass France, Courbevoie (FR)

( * ) Notice: Subject to any disclaimer, the term of this patent is extended or adjusted under 35 U.S.C. 154(b) by 0 days.

(21) Appl. No.: 10/482,414

(22) PCT Filed: Jul. 10, 2002

(86) PCT No.: PCT/FR02/02414

§ 371 (c)(1),
(2), (4) Date: Jun. 4, 2004

(87) PCT Pub. No.: WO03/007065

PCT Pub. Date: Jan. 23, 2003

(65) Prior Publication Data

US 2004/0233499 A1    Nov. 25, 2004

(30) Foreign Application Priority Data

Jul. 12, 2001    (FR) .................................. 01 09315

(51) Int. Cl.
*G02F 1/15*  (2006.01)
*G02F 1/03*  (2006.01)
*B32B 9/04*  (2006.01)
*B32B 19/00* (2006.01)

(52) U.S. Cl. ...................... 359/265; 359/245; 359/274; 359/291; 359/295; 428/446; 428/689; 428/698; 428/1.1; 206/524.4; 257/787; 313/512

(58) Field of Classification Search ............... 359/265, 359/245, 273, 274, 275, 290, 291, 295, 298; 257/787, 758; 313/512; 206/524.4, 524.1; 428/446, 1.1, 689, 698
See application file for complete search history.

(56) References Cited

U.S. PATENT DOCUMENTS

| | | | | |
|---|---|---|---|---|
| 4,852,979 | A | | 8/1989 | Agrawal ..................... 359/274 |
| 5,216,536 | A | * | 6/1993 | Agrawal et al. ............ 359/274 |
| 5,530,581 | A | | 6/1996 | Cogan ........................ 359/265 |
| 5,833,070 | A | | 11/1998 | Mizuno et al. .......... 206/524.4 |
| 6,522,067 | B1 | * | 2/2003 | Graff et al. ................. 313/512 |
| 6,548,912 | B1 | * | 4/2003 | Graff et al. ................. 257/787 |
| 6,690,500 | B1 | * | 2/2004 | Ogasawara et al. ......... 359/245 |
| 6,743,524 | B1 | * | 6/2004 | Schaepkens ................ 428/689 |
| 2003/0219632 | A1 | * | 11/2003 | Schaepkens ................ 428/698 |
| 2004/0175512 | A1 | * | 9/2004 | Schaepkens ................ 428/1.1 |
| 2004/0175580 | A1 | * | 9/2004 | Schaepkens ................ 428/446 |

FOREIGN PATENT DOCUMENTS

| | | |
|---|---|---|
| JP | 62-040432 | 2/1987 |
| JP | 5-116254 | 5/1993 |
| WO | 99/17890 | 4/1999 |

* cited by examiner

*Primary Examiner*—Loha Ben
(74) *Attorney, Agent, or Firm*—Oblon, Spivak, McClelland, Maier & Neustadt, P.C.

(57) ABSTRACT

The subject of the invention is an electrically controllable device having variable optical and/or energy properties of the electrochromic type, which comprises a functional film consisting of a layer or a stack of layers which is placed between two external substrates which meet the following criteria:

➢at least one is essentially transparent;
➢at least one is based on one (or more) film(s) based on one or more polymers;
➢each of them is a water vapor barrier, with a water vapor permeability of at most 1 $g/m^2/24$ h, especially at most 0.1 $g/m^2/24$ h.

30 Claims, No Drawings

ELECTRICALLY CONTROLLABLE DEVICE HAVING VARIABLE OPTICAL AND/OR ENERGY PROPERTIES

The invention relates to electrically controllable devices having variable optical and/or energy properties. It relates more particularly to devices using electrochromic or viologen-based systems operating in transmission or in reflection. It may also apply to other systems of the electro luminescence type, optical valves, etc.

Examples of viologen-based systems are disclosed in patents U.S. Pat. No. 5,239,406 and EP-612 826.

Electrochromic systems have been very extensively studied. They are known in general to comprise two layers of electrochromic materials separated by an electrolyte and flanked by two electrodes. Under the effect of a power supply, each of the electrochromic layers can reversibly inject cations, which results in a change in its properties (for example, in the case of tungsten oxide, a color change from pale blue to midnight blue).

The most promising electrochromic systems are "all-solid-state" systems, that is to say those in which all the layers, and most particularly the electrolyte, are of an essentially mineral nature; this is because it is possible to deposit in succession, on the same substrate, all the layers using the same technique, especially sputtering. Examples of these "all-solid-state" systems are described in detail in the patents EP-867 752, EP-831 360, WO 00/03289 and WO 00/57243.

There are also other electrochromic systems, especially those in which the electrolyte is a layer based on a polymer or a gel, the other layers generally being mineral layers (reference may be made, for example, to the patents EP-253 713 and EP-670 346).

There are also electrochromic systems in which all of the layers are based on polymers, and then we speak of "all polymer systems".

The invention applies especially to the electrochromic systems known as "all-solid-state" electrochromic systems.

Many applications have already been envisioned for these systems. Most generally, they are employed as glazing for buildings or glazing for vehicles, especially as sunroofs, or else when they then operate in reflection and no longer in transmission, as antidazzle rear-view mirrors.

These systems have in common the fact that they may, to a greater or lesser extent, be sensitive to mechanical or chemical attack, to contact with water or to exchanges with the outside. This is the reason why, to preserve their proper operation, these "active" systems are usually placed between two protective rigid substrates. In the case of an "all-solid-state" electrochromic system, all the layers of the system are generally deposited on a glass substrate, which is then laminated to a second glass substrate via a thermoplastic sheet, so that the active system is between two glass substrates. In the case of an electrochromic system in which the electrolyte is a polymer, some of the mineral layers are generally deposited on one of the glass substrates, the remainder on the other one, and the two glass substrates are then joined together by means of a polymer electrolyte film. (The assembly can then be laminated to a third glass substrate via a thermoplastic sheet).

Furthermore, by providing suitable peripheral sealing means, the active system is therefore, in particular in these two situations, completely protected, the glass substrate being a particularly inert material, constituting especially an excellent barrier to water and to gases in general.

However, these configurations based on several glass substrates may, for some applications, have drawbacks, especially in terms of weight, size or suitability for matching particular shapes.

The object of the invention is therefore to develop novel configurations for devices including this type of active system, which configurations can in particular meet a requirement to be lighter and smaller in size and/or which can assume more varied shapes, without these improvements being at the expense of the protection of the active system from the outside.

The subject of the invention is firstly an electrically controllable device having variable optical and/or energy properties of the electrochromic type, said device comprising a functional film consisting of a layer or a stack of layers. This functional film is placed between two external substrates which meet the following criteria:

$\hat{1}$—at least one is essentially transparent;

$\hat{2}$—at least one is based on one (or more) film(s) based on one or more polymers;

$\hat{3}$—each of these two external substrates is a water vapor barrier, with a water vapor permeability of at most 1 $g/m^2/24$ h, especially at most 0.1 $g/m^2/24$ h (according to the NF-T30 018 standard).

Within the context of the invention, the term "device" is understood to mean especially any glazing assembly operating in transmission or in reflection (mirror) in the wider sense of the term, that is to say without necessarily involving a glass substrate. It may be a finished product, that can be used as such, or an intermediate product, that is to say a product that can be used and manipulated as such, but which is intended to be affixed to another surface, for example to a conventional glazing assembly or a television screen or computer screen (or to be incorporated into a laminated or multiple glazing structure).

Within the context of the invention, the term "external substrates" is understood to mean the substrates which flank and delimit the device, one of the faces of these being liable to be in contact with the ambient atmosphere. In particular, this may be, on the one hand, the substrate carrying the functional film (that on which all or some of the layers of which it is composed have been deposited) and, on the other hand, the backing substrate, that intended to protect the functional film on the opposite side to the carrier substrate. Various configurations will be explained in detail below.

The invention therefore consists in choosing for one of the external substrates at least one material based on a polymer rather than on glass. The advantages of plastic substrates, within the wider sense, are numerous; they are lighter and break less easily. They made it possible to dispense with an operation of lamination between two glass substrates, this operating requiring heat and pressure to be applied to the various components in question. They may also assume very particular shapes and have very pronounced curvatures. In general, they are easily cut to ad hoc dimensions. However, they usually do not provide the impermeability and inertness that glass guarantees, most particularly with respect to water, especially in vapor form.

However, it has turned out that it is very important for the functional film, most particularly when it is an electrochromic film, to be isolated from the surrounding moisture, in liquid form but also in gaseous form. The invention therefore consists in selecting polymer substrates which nevertheless are capable of providing a very high level of water vapor impermeability, in any case sufficient not to impair the properties of the functional film.

Advantageously, one of the two external substrates, whether made of glass or based on one or more polymers, is the substrate on which at least some of the layers of the functional film have been deposited, and especially all of the layers, either by direct contact or via an adhesion layer. It all depends on the type of substrate and the type of layers. Thus, on glass, it is possible to deposit mineral layers directly, by pyrolysis, or by sputtering. On the other hand, on polymer-based substrates, it may be necessary to firstly deposit a layer intended to allow deposition with tying of these mineral layers. This "adhesive" layer may also be very thin, and even discontinuous. It may be grafted to the surface of the substrate. It may be replaced or supplemented with a surface treatment of the substrate (of the texturizing or other type) to which we will refer later.

Advantageously, the functional film may be one of the electrochromic films described in the preamble of the present application, especially an "all-solid-state" electrochromic film. The invention may, however, apply in a similar manner to other electrically controllable systems, of the viologen type, of the electroluminescent type (an example of which is described in the patent FR-2 770 222), of the optical valve type, (an example of which is described in the patent WO 93/09460) or of the liquid-crystal system type (examples of which are described in the patents EP-88 126, EP-268 877, EP-238 164, EP-357 234, EP-409 442 and EP-964 288). It thus applies to any system/glazing assembly comprising at least one thin layer liable to deteriorate by contact with gaseous species coming from the ambient atmosphere, most particularly water vapor.

If one of the external substrates is made of glass, it inherently possesses the required level of impermeability with respect to water vapor, especially in the usual thicknesses (for example 1 to 8 mm).

On the other hand, when one (or both) of the external substrates is based on a polymer, the invention provides several variants which also achieve the required level.

These variants are not limiting, and can be used separately or together.

According to a first variant, at least one of the external substrates comprises a sheet of halogenated polymer, especially polyhalogenated polymer (i.e. one containing at least two different types of halogen) since this type of polymer tends to be hydrophobic and also to act as an effective water vapor barrier. This is most particularly the case with polychlorotrifluorethylene (PCTFE) or of one of its derivatives. This is because PCTFE has a water vapor permeability of the order of 0.01 to 0.1 $g/m^2/24$ h for a thickness of about 20 to 300 or 250 micrometers (especially 100 to 200 micrometers), and it has the great advantage of being able to be transparent. It is also possible to use copolymers, combining PCTFE with other polymers, especially polyvinylidene fluoride. (Films of PCTFE or PCTFE-PVDF copolymer are sold by Allied Signal under the name ACLAR).

However, this type of polymer also tends to have a low surface energy, which explains why it has a tendency to adhere insufficiently to other materials, especially in this case to the materials of the functional film (whether the sheet of polymer acts as carrier substrate or as backing substrate). It is therefore beneficial to treat the sheet of halogenated polymer, the treatment being intended to increase the surface energy of the material; it is possible to treat only that face intended to be oriented toward the functional film, for example by a surface treatment which may consist of a chemical treatment, an electrical treatment by corona discharge, or any other treatment making it possible to obtain surface texturing. Said face may also be provided with an adhesive layer. Covered by the term "adhesive layer" may be a true continuous layer, for example a double-sided adhesive or a so-called transfer adhesive, like those sold by 3M, for example under the references 8141 or 8142. Also covered by this term are discontinuous layers, which form points of adhesion distributed over the surface of the polymer film. Also covered by this term is a layer chemically grafted to the surface of the polymer, or a thin layer of another polymer of the ethylene-vinyl acetate (EVA) type, said layer being combined by coextrusion.

Once the halogenated polymer film has been treated thus, it may be made to adhere satisfactorily to the functional film, or else the functional film may be deposited on the halogenated polymer film, for example by sputtering.

According to a second variant, at least one of the external substrates consists of at least one film based on one or more polymers, the permeability of which is lowered down to the required level by depositing, on at least one of its faces, one or more thin mineral layers.

The term "thin" is understood to mean layers having an interferential thickness, that is to say thicknesses between 5 nm and 1 $\mu$m, especially between 10 and 500 nm.

Preferably these layers are chosen to be transparent and sufficiently dense. Apart from their density, it is important to chose them in such a way that they do not exhibit any defects breaking their continuity. They may be chosen from silicon derivatives, such as silicon oxide, silicon oxycarbide or oxynitride, and silicon nitride, and/or aluminum derivatives such as aluminum oxide, oxynitride or nitride. The layers based on silicon derivatives may furthermore contain a small amount of a metal such as aluminum or of boron (these being additives for making the silica target sufficiently conducting in the case of deposition by reactive sputtering in the presence of oxidizing and/or nitriding agents). They may also be transparent conducting layers based on doped semiconducting oxides, such as tin-doped indium oxide (ITO), doped tin oxide, for example fluorine-doped tin oxide (F:SnO$_2$), or doped zinc oxide, for example aluminum-doped zinc oxide (Al:ZnO), layers. These layers may advantageously be deposited, in a known manner, by non reactive sputtering, using oxide targets in particular, or reactive sputtering, using Si targets (the Si being doped with Al or B for example, as mentioned above) or Al targets and reactive atmospheres containing, depending on the case, an oxidizing agent and/or a nitriding agent and/or a carbon agent. When the layers are conducting layers, these may also advantageously act as electrodes within the functional film, when they have the appropriate characteristics and thickness.

According to a third variant, at least one of the external substrates includes a nanocomposite film. By this is meant an organomineral composite film comprising a polymer matrix into which mineral compounds of nanometric size and of a high form factor have been introduced. In particular, this may be, for example, clay exfoliated by shear, in a polymer matrix before extrusion. These mineral compounds make it possible to increase the water diffusion path through the film and thus make it more impermeable, white still leaving it essentially transparent, if it is transparent in the absence of said compounds.

According to a fourth embodiment, at least one of the external substrates includes a plurality of films based on polymers having different water vapor permeabilities, the combination of the films making it possible to achieve overall the required level of permeability and possibly sufficient adhesion to the functional film when said external substrate and the functional film are in direct contact. Several polymer films may be combined at the moment of manufacture of the device in its entirety, or may be produced beforehand, by cocalandering, or coextrusion.

In fact, it is very beneficial from an industrial standpoint to superpose several polymer-based films, since this allows greater flexibility in production and better management of raw material costs.

This is because, for example, it is possible to provide only one sheet of water-impermeable polymer as thin as possible for obtaining the required water vapor permeability (this being a high-performance and expensive polymer, like PCTFE) and to add to it a sheet of another polymer which is much more usual and much less expensive, in order to give the combination a certain mechanical strength for example, or to allow this sheet to adhere to the rest of the device.

Everything also depends on the intended application: in some applications, it will be necessary to have a certain rigidity (scratch resistance), hence the addition of a rigid plastic substrate to the PCTFE, which, with thicknesses of the order of 100 micrometers (for example between 50 and 300 micrometers), is flexible.

According to one non limiting embodiment, the device according to the invention has a rigid or semirigid structure, with at least one of the two external substrates comprising a glass, a substrate made of a rigid polymer such as polycarbonate (PC) or polymethyl methacrylate (PMMA) (if PMMA or PC is chosen instead of glass, provision is made to combine it with a water vapor barrier according to one of the abovementioned variants.) It may then contain only one of these rigid substrates, with a configuration of the following type:

Rigid external substrate 1/optional adhesive/functional film/optional adhesive/external substrate based on one or more flexible polymers.

Compared with a two-glass configuration, the lightening effect obtained is already very significant in this configuration.

According to another embodiment, the device according to the invention has a flexible structure, with the two external substrates in the form of one or more films based on one or more flexible polymers. What is then obtained is quite a novel type of "glazing" in the wider sense, which can be handled, folded, wound and unwound at will, thereby opening up the field to many new applications. This is therefore an extremely light "glazing" that can be used as such (as a replacement for curtains, as a protective screen, etc.) It can also be used to affix it to perexisting glazing assemblies, in order to give them a new functionality (renovation). It may also be incorporated into glazing with a laminated structure, by placing it between two sheets of thermoplastic polymer and then by laminating the assembly between two glass substrates (to make windshields, for example, or to be partial or complete substitute for conventional laminated glazing).

Of course, the device according to the invention may have additional functionalities, independently of those conferred by the functional film. It may thus include at least one of the following coatings: a coating reflecting at least some of the wavelengths lying in the infrared (solar-protection or low-emissivity coating), a hydrophilic or hydrophobic coating, a photocatalytic coating having antisoiling properties (for example comprising $TiO_2$ crystallized in anatase form), an antireflection coating, a coating providing magnetic shielding, etc.

The device according to the invention may operate in transmission (glazing) or in reflection (mirror). In the latter case, one of the external substrates may be reflecting or be made reflecting by means of a suitable coating.

There are many applications for this type of device. Without implying any limitation, a few of them may be listed: these may be in the field of aeronautics, for making cabin windows or windshields (for example in the form of a strip present only in the upper part), or partitions between different areas of the airplane. They may also be in the building field, for making exterior glazing, doors or partitions, for new buildings or for renovation. They may also be in the automobile field, for rear-view mirrors, sunroofs, glazing and most particularly the upper part of windshields, or of any other means of locomotion by air, road (trains) or sea.

They may also be in the ophthalmic field, for spectacles, using, for example, PC substrates. The devices according to the invention may also be used as a projection shield or display screen, as a contrast enhancing/antidazzle element for a television screen or computer screen or for a mobile telephone or any other display device.

The glazing incorporating the device according to the invention may be laminated glazing or multiple glazing of the double-glazing type. In the case of laminated glazing, this may involve conventional lamination with two glass sheets joined together by a sheet of thermoplastic polymer. They may then be functionalized by affixing to them a functional film protected between two polymer substrates. The laminating may also be what is called asymmetrical laminating, using a single glass sheet and at least one sheet of polymer of the polyurethane type having energy absorption properties optionally combined with another sheet of polymer having self-healing properties (reference may be made for further details to the patents EP 132 198, EP 131 523 and EP 389 354.) In this situation, the functional film may be inserted between the glass and the sheets of polymer if necessary with interposition on the polymer sheet side of the appropriate water vapor barrier according to one of the variants described above.

The invention will be explained in detail below with the aid of nonlimiting examples.

EXAMPLE 1

This may be an electrochromic glazing assembly based on a single glass substrate, according to the following configuration:

glass$^{(1)}$/functional film$^{(2)}$/adhesive$^{(3)}$/PCTFE$^{(4)}$.

The characterized of the various elements are the following glass (1): conventional clear silico-soda-lime glass with a thickness of 0.5 to 6 mm, in this case 2.1 mm, with dimensions of 50×50 cm$^2$;

functional film (2): "all-solid-state" electrochromic system comprising the following stack:

➢ a bottom conducting layer 2, which is a bilayer consisting of a 50 nm SiOC first layer surmounted by a 400 nm F: $SnO_2$ second layer (the two layers preferably being deposited in succession by CVD on the float glass before cutting), or alternatively this may be a bilayer with a 20 nm B: SION first layer surmounted by a 150 nm ITO layer, ➢ a first Layer of anodic electrochromic material consisting of 40 to 100 nm of hydrated iridium oxide or 40 to 400 nm of hydrated nickel oxide, which layer may or may not be alloyed with other metals, ➢ a layer consisting of 100 nm of tungsten oxide, ➤ a second layer consisting of 100 nm of hydrated tantalum oxide or hydrated silica oxide, alternatively it may be a layer of antimony or zirconium oxide or an alloy with at least one of these oxides (preferably hydrated), ➤ a second layer of cathodic electrochromic material, based on 100 to 370 nm of tungsten oxide $WO_3$, ➤ a conducting top layer consisting of 100 to 300 nm of ITO.

All these layers (apart from the first one) are deposited in a known manner by magnetic-field enhanced reactive sputtering;

adhesive (3): transfer adhesive sold by 3M under the reference 8141 (alternatively, a 0.76 mm thick sheet of polyurethane or EVA may be used); and PCTFE (4): thickness about 150 micrometers.

The connections, all the means used to supply the two electrically conducting layers with electricity and the peripheral sealing means will not be detailed: it is conventional and described in the patents mentioned in the preamble.

In particular, it may include an array of conducting wires in contact with the top electrode, as described in the patent EP-1 078 299.

What is therefore obtained is a glazing assembly which is light (weighing about 5 kg/m$^2$) and thin (overall, less than 2.5 mm in thickness), and which nevertheless has a durability of its electrochromic function similar to that obtained with a configuration in which the PCTFE is replaced with a thermoplastic sheet and a second glass substrate according to a laminated glass configuration.

EXAMPLE 2

This is an electrochromic glazing assembly with no glass, according to the following configuration:

polycarbonate$^{(5)}$/adhesive$^{(3)}$/PCTFE$^{(4)}$/adhesive$^{(3)}$/
functional film$^{(2)}$/adhesive$^{(3)}$/PCTFE$^{(4)}$/
adhesive$^{(3)}$/polycarbonate$^{(5)}$.

The functional film, the PCTFE film and the adhesives are the same as in example 1, while the polycarbonate (PC) has a thickness of about 3 mm (2 to 5 mm).

What is obtained is a glazing assembly whose two external substrates are rigid, this being essential in some applications, but possibly lighter than a glazing assembly having two glass substrates. This type of glazing without any glass may be used to equip means of transportation, especially in the aeronautic field and in shielded applications, since the PC and other similar plastic substrates are materials particularly suited to withstanding shock by energy absorption. It may also be advantageously used as a sunroof.

EXAMPLE 3

This is an electrochromic glazing assembly with no glass, according to the following configuration:

PET$^{(1)}$/functional film$^{(2)}$/adhesive$^{(3)}$/PET$^{(4)}$     (1)

The functional film (2) is the same as in the previous cases, as is the adhesive (3).

Here, the two external substrates are sheets of PET (polyethylene terephthalate) 100 to 300 micrometers in thickness. These may be replaced with sheets of PC of 0.2 to 1 mm in thickness. What is then obtained is flexible "plastic" glazing, which constitutes a useful intermediate product.

One possibility consists, in a subsequent step, in laminating it between two glass substrates with the aid of sheets of thermoplastic polymer. One possible application for the flexible glazing according to the invention thus consists in acting as intermediate product for making laminated glazing of the following type:

glass/thermoplastic sheet (such as polyvinyl butyral (PVB) or ethylene vinyl acetate (EVA) or certain polyurethanes (PU))/"flexible plastic glazing according to the invention"/thermoplastic sheet again/glass (2)

or so-called asymmetrical laminated glazing with a single glass substrate and one or films based on polyurethane having an energy absorption function and possibly a self-healing function (details about this type of glazing are described in the patents EP 132 198, EP 131 523, EP389 354), or glazing based on a single glass substrate, in which that face of the functional film not facing the glass is protected by a plastic substrate capable of acting as a water vapor barrier according to one of the variants of the invention.

This type of structure is useful as a substitute for glazing requiring lamination for safety reasons. In particular, windshields for aircraft, trains and automobiles are conceivable. It is possible in particular to manufacture windshields in which only one part is provided with the functional system, especially as an upper antidazzle band: the aforementioned structure (2), or a similar structure, is in this region, and in the rest of the windshield there is exactly the same configuration, but without the functional system or even without the "flexible glazing" in its entirety.

This "intermediate" product may thus be manufactured/stored in the form of large rolls, which can then be cut up to the desired dimensions.

EXAMPLE 4

This is, like example 3, a flexible electrochromic glazing assembly, without any glass, but using as external substrates very high-performance films made of modified PCTFE, according to the following configuration:

modified PCTFE$^{(1)}$/functional film$^{(2)}$/adhesive$^{(3)}$/
modified PCTFE$^{(4)}$ The functional film (2) is the same as in the previous cases, as is the adhesive (3).

The modified PCTFE was surface modified in order to increase its surface energy, for example by a Corona discharge surface treatment. Alternatively, it may be coextruded with a sheet of polymer of the PET type.

EXAMPLE 5

The purpose here is to functionalize a conventional sunroof based on standard laminated glazing of the glass/thermoplastic sheet/glass type, by joining to it the functional film, included in a structure of the following type:

PCTFE/adhesive/functional film/PET type polymer film. In this structure, the functional film is isolated from external moisture on one side by the PCTFE and on the other by the lamination of the PET to the glazing with the aid of a thermoplastic sheet or of a double-sided adhesive.

The final configuration is therefore:

Glass/thermoplastic sheet/glass/adhesive or
thermoplastic sheet/PET/functional film/
adhesive/PCTFE It should be noted that all the glazing operating in transmission according to the invention may include stacks of infrared-reflecting/solar-protection thin layers: these layers make it possible to protect, if necessary, the functional film from solar radiation liable to degrade it long term. They may furthermore serve to protect, if necessary, the polymer substrates depending on their configuration in the glazing. These stacks consist especially of two silver layers alternating with dielectric coatings. These stacks may be deposited on the glass, or on plastic substrates such as PET substrates. Examples of these are given in the patents EP 638 528, EP 718 250, EP 844 219, EP 847 965, EP 1 010 677 and WO-FR-00/2582. The patent EP 825 478 describes this type of combination between an electroactive film of the electrochromic type and layers having a thermal function.

It is thus possible in the glazing to have polymer films in contact on one of their faces with the functional film and on their other face with a stack of thin layers reflecting at least some of the infrared (and/or ultraviolet).

EXAMPLE 6

This is a double-glazing configuration, namely:

glass/functional film/adhesive/PCTFE/gas-filled cavity/glass.

The glass substrates, the functional film, the adhesive and the PCTFE are those used in the previous examples. Indeed, the functional film is between, on the one hand, a glass substrate, and, on the other hand, a particular polymer of the PCTFE type as substrates "external" to the functional film, in the sense that the PCTFE is in fact in contact with the gas which, in the most standard cases, is air.

EXAMPLE 7

The aim here is to make a rear-view mirror, with the following configuration:

glass/functional film/polymer reflecting in the visible.

The functional film and the glass are identical to those used in example 1.

The polymer is such that it has the desired permeability of at most 1 $g/m^2/24$ h.

In its preferred variant, the configuration of the rear-view mirror is as follows:

Glass/functional film/reflecting layer/adhesive/ PCTFE, with the PCTFE and the adhesive being similar to those used in example 2, and the reflecting layer being a layer of metal, in this case aluminum, with a thickness of about 50 or 80 nm (especially 20 to 100 nm).

This electrochromic rear-view mirror configuration is novel; there the electrochromic system is deposited on the glass and the reflecting layer on the plastic substrate, whereas in general the reverse is the case. However, depositing the electroactive system on the glass makes it easier to obtain a rear-view mirror of perfect optical quality, an essential point for this application in reflection.

EXAMPLE 8

This is a rear-view mirror similar to that described in example 7. The difference lies in the way in which the functional film is protected from water vapor—instead of using on the opposite side of the film to the glass, a film of PCTFE, the reflecting foil of aluminum is thickened until it reaches the water vapor permeability required according to the invention: in this case, it has a thickness of at least several micrometers, especially at least 5 or 10 micrometers.

The thickness chosen in this example is 12 micrometers. The configuration of the mirror is thereby simplified:

glass/functional film/"thick" reflecting layer/protective varnish or polymer (PET, etc.)

In conclusion, the invention makes it possible to obtain "electrochromic glazing" in the broad sense, which may get round the problem of weight and stiffness that existed hitherto, jeopardizing the durability of its functionality.

Depending on the conditions of use, (use as outdoor glazing, as indoor glazing, exposure or not to contact with users, temperature or moisture conditions, etc.), it is possible to adapt the composition of the external substrates of these glazing assemblies, especially those made of polymer.

What is claimed is:

1. An electrically controllable device having variable electronic optical properties, electronic energy properties, or both, comprising a functional film comprising a layer or a stack of layers and which is placed between two external substrates which meet the following criteria:
   at least one substrate is essentially transparent;
   at least one substrate comprises one or more polymer films;
   each substrate is a water vapor barrier having a water vapor permeability of at most 1 $g/m^2/24$ h.

2. The device as claimed in claim 1, wherein one of the two external substrates is made of glass or is a polymer film and has at least one layer of the functional film present thereon.

3. The device as claimed in claim 2, wherein at least one layer of the functional film is in direct contact with the external substrate or has an adhesion layer interposed between the functional film and the external substrate.

4. The device as claimed in claim 1, wherein the functional film is an electrochromic film comprising at least two layers having electrochromic properties separated by an electrolyte and flanked by electrodes.

5. The device as claimed in claim 4, wherein the layers having electrochromic properties are all-solid-state electrochromic films, all-polymer electrochromic films or polymer electrolytes.

6. The device as claimed in claim 1, wherein at least one of the external substrates comprises a sheet of at least one halogenated polymer.

7. The device according to claim 6, wherein the polymer sheet is polychlorotrifluorethylene (PCTFE) or a derivative thereof.

8. The device as claimed in claim 7, wherein the polymer sheet is a PCTFE/polyvinylidene fluoride copolymer.

9. The device as claimed in claim 6, wherein the sheet of halogenated polymer is surface pretreated, and is in contact on a surface pretreated face with the functional film.

10. The device as claimed in claim 9, wherein the pretreated surface is texturized, chemically treated, electrically treated or comprises an adhesive layer.

11. The device as claimed in claim 6, wherein the sheet is polyhalogenated.

12. The device as claimed in claim 1, wherein at least one of the external substrates comprises at least one film comprising one or more polymers having a vapor permeability of at most 1 $g/m^2/24$ h and one or more thin mineral layers on one face thereof.

13. The device as claimed in claim 12, wherein the mineral layer is dense and is a silicon derivative, an aluminum derivative or a transparent conducting oxide layer.

14. The device as claimed in claim 12, wherein the vapor permeability is at most 0.1 $g/m^2/24$ h.

15. The device as claimed in claim 12, wherein the mineral layer is at least one selected from the group consisting of $SiO_2$, $SiON$, $SiOC$, $Si_3N_4$, $AlN$, $Al_2O_3$, a tin doped indium oxide, a doped tin oxide and a doped zinc oxide.

16. The device as claimed in claim 1, wherein at least one of the external substrates includes a nanocomposite film comprising one or more mineral compounds of nanometric size having a high form factor.

17. The device as claimed in claim 16, wherein the nanocomposite film comprises a clay exfoliated by shear in a polymer matrix.

18. The device as claimed in claim 1, wherein at least one of the external substrates includes a plurality of polymer films having different water vapor permeabilities, the combination of all of said polymer films having an overall water vapor permeability of less than 1 $g/m^2/24$ h.

19. The device as claimed in claim 18, wherein the combination of all polymer films has an overall water vapor permeability of less than 0.1 $g/m^2/24$ h.

20. The device as claimed in claim 1, wherein at least one of the external substrates includes a plurality of polymer films superimposed and combined by cocalandering or coextrusion.

21. The device as claimed in claim 1, having a rigid or semi rigid structure, with at least one of the two external substrates comprising a glass, polycarbonate or polymethyl methacrylate substrate.

22. The device as claimed in claim 21, having only a single rigid or semi rigid external substrate, with the following configuration rigid external substrate/optional adhesive/functional film/optional adhesive/external substrate comprising one or more flexible polymers.

23. The device as claimed in claim 1, having a flexible structure, with the two external substrates in the form of one or more films each comprising one or more flexible polymers.

24. The device as claimed in claim 1, further comprising at least one of a coating reflecting at least some of the wavelengths lying in the infrared, the ultraviolet, or both, a hydrophilic coating, a hydrophobic coating, a photocatalytic coating having antisoiling properties, an anti-reflection coating, or a coating providing magnetic shielding.

25. The device as claimed in claim 24, comprising a stack of thin layers for solar protection.

26. The device as claimed in claim 25, comprising two silver layers.

27. The device as claimed in claim 1, further comprising a glazing assembly in which the functional film functions in transmission or a mirror in which the functional film functions in reflection.

28. A laminated, double or multiple glazing comprising the device as claimed in claim 1.

29. A mirror comprising the device as claimed in claim 1.

30. The mirror as claimed in claim 29, comprising in the following sequence: glass/functional film/reflecting coating/optional adhesive/polymer.

* * * * *